Aug. 11, 1953 D. B. DIMICK 2,648,200
LOCK JOINT CRADLE INVERT UNDERDRAIN PIPE
Filed Oct. 10, 1951 3 Sheets-Sheet 1
FIG. I.
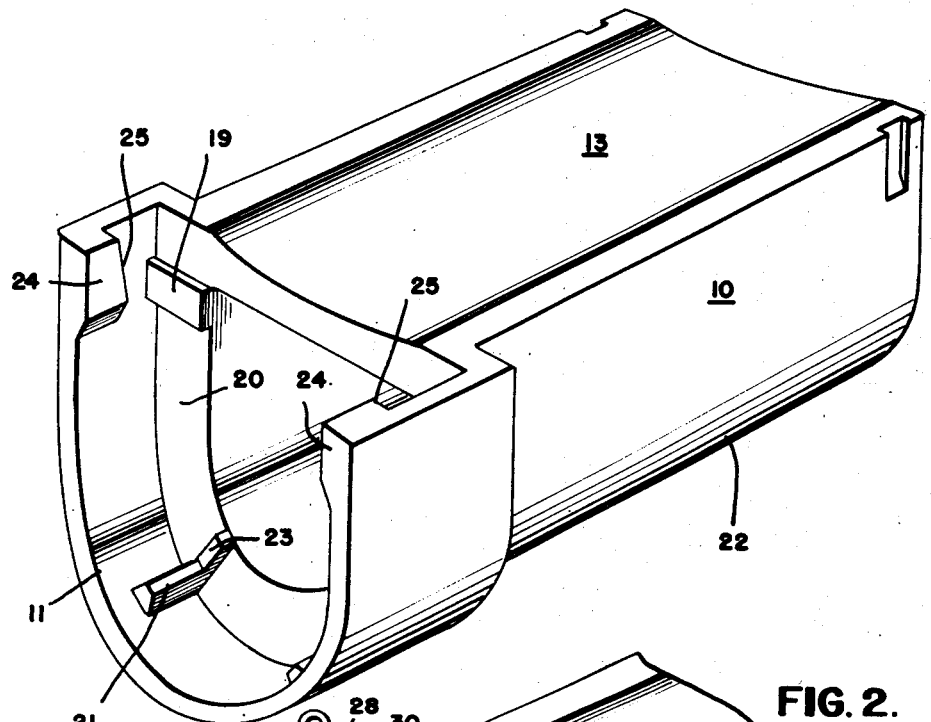
FIG. 2.
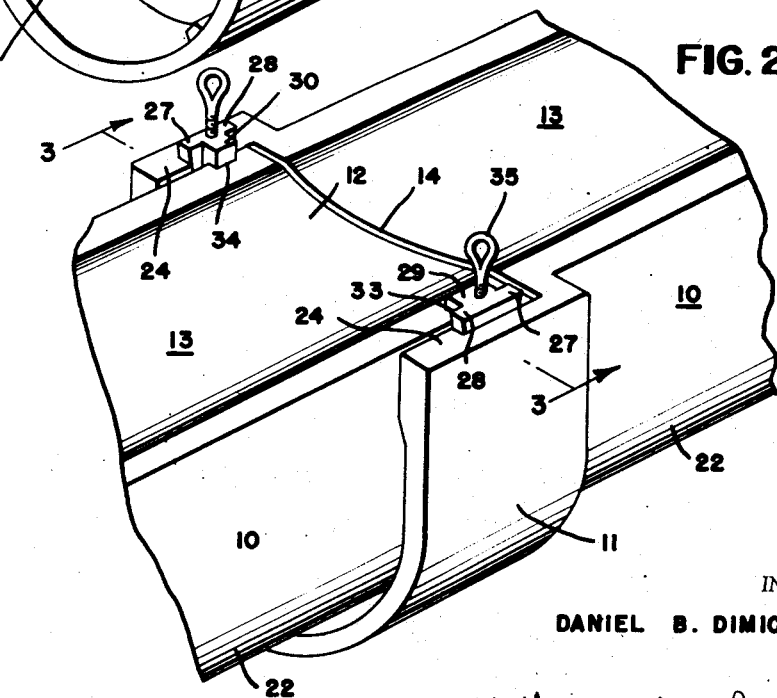
INVENTOR
DANIEL B. DIMICK
BY Wilkinson & Mawhinney
ATTORNEYS Aug. 11, 1953  D. B. DIMICK  2,648,200
LOCK JOINT CRADLE INVERT UNDERDRAIN PIPE
Filed Oct. 10, 1951  3 Sheets-Sheet 2

INVENTOR
DANIEL B. DIMICK
BY Wilkinson & MawKinney
ATTORNEYS

Aug. 11, 1953  D. B. DIMICK  2,648,200
LOCK JOINT CRADLE INVERT UNDERDRAIN PIPE
Filed Oct. 10, 1951  3 Sheets-Sheet 3
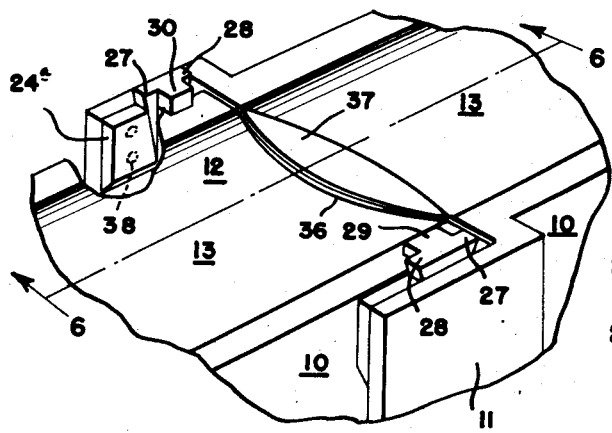
FIG. 5.
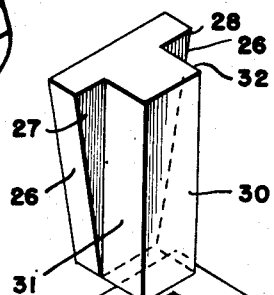
FIG. 7.
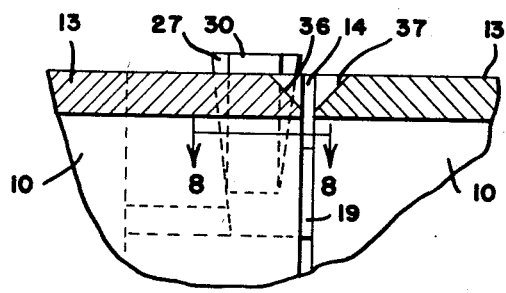
FIG. 6.
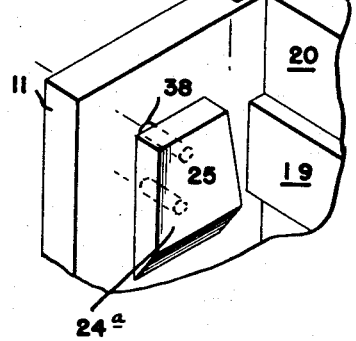
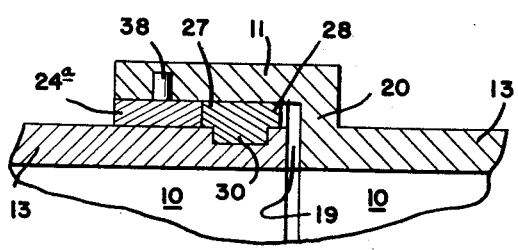
FIG. 8.
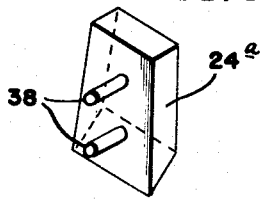
FIG. 9.
INVENTOR
DANIEL B. DIMICK
BY Wilkinson & Mawhinney
ATTORNEYS Patented Aug. 11, 1953

2,648,200

UNITED STATES PATENT OFFICE 2,648,200

LOCK JOINT CRADLE INVERT UNDERDRAIN PIPE

Daniel B. Dimick, Wellesley, Mass.

Application October 10, 1951, Serial No. 250,747

9 Claims. (Cl. 61—10)

The present invention relates to improvements in lock joint cradle invert underdrain pipe and constitutes certain improvements over my prior Patent 2,089,115, granted August 3, 1937, reissued May 24, 1938, Re. 20,736, entitled Subdrainage Pipe.

The pipe of my prior patent has proved very successful in practice. However, recent tests and State specifications require that the opening for introducing the drainage water to the pipe shall be at a fixed minimum and that provisions must be made for maintaining this minimum after the pipe is laid and throughout the service of the pipe. Particularly is this important in certain sections of the country where a fine back fill material is used above the pipe and above the drain openings leading to the subdrainage pipe. Large drain openings admit such back fill material and tend to clog the openings and the pipe and carry off undesirable amounts of the back fill material.

The problem posed was to regulate and control the width of the drainage pipe opening and to maintain the same at all times after the pipe was laid.

The invention has for its object to meet these requirements and this problem in a manner to prevail over careless laying methods and unskilled workmen resulting in haphazard assembly of the pipe sections into the unified subdrainage pipe.

The invention has for its further object to provide improved lock joint pipe sections of simple construction capable of being assembled and locked together by unskilled labor in a minimum of time and with assurance of proper inter-relation.

A still further object of the invention is to provide these advantages in a construction which has a negligible increase in production costs over the subdrainage pipe of my prior patent.

A still further object of the invention is to provide a device which is positive in action and which will maintain the pipe sections in an interlocked relationship which will assure a preselected minimum drainage opening maintained at all times.

It is a still further object of the invention to provide a device which is applicable to vitreous clay pipe manufacturing methods and equipment.

With the foregoing and other objects in view, the invention will be more fully described hereinafter, and will be more particularly pointed out in the claims appended hereto.

In the drawings, wherein like symbols refer to like or corresponding parts throughout the several views.

Figure 1 is a perspective view of a preferred form of subdrainage pipe section constructed in accordance with the present invention.

Figure 2 is a fragmentary perspective view showing the adjacent ends of two of the pipe sections assembled together with the wedge keys in place.

Figure 5 is a fragmentary perspective view, with parts broken away, of a modified form of the invention of which the locking lugs are made separately from the pipe sections and applied thereto after extrusion and before firing.

Figure 6 is a longitudinal fragmentary section taken on the line 6—6 of Figure 5.

Figure 7 is a fragmentary exploded perspective view of the bell end of a pipe section with the wedge key positioned thereabove in position for downward insertion.

Figure 8 is a horizontal section taken on the line 8—8 in Figure 6, and

Figure 9 is a perspective view of a modified form of locking lug employed.

Figure 3:
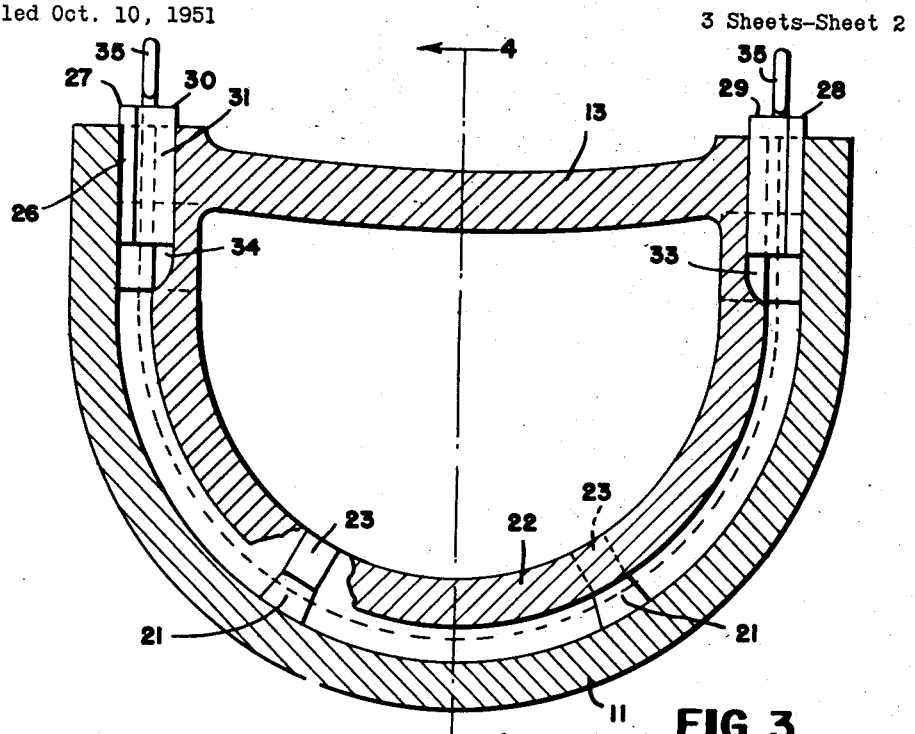
Figure 3 is a vertical section taken on an enlarged scale on the line 3—3 in Figure 2.
Figure 4:
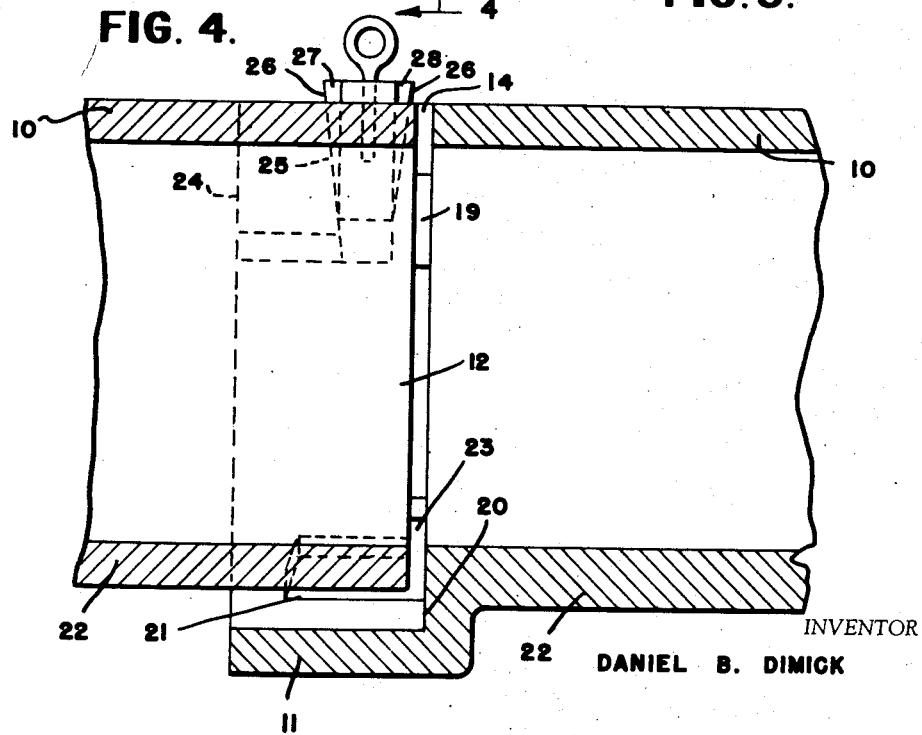
Figure 4 is a vertical longitudinal central section taken on the line 4—4 of Figure 3.

Referring more particularly to the drawings, 10 designates a number of sections of the underdrain pipe. Each section may be made of clay, cast iron, or other suitable material and is substantially semi-circular in cross section so as to provide a hollow body of substantial width and depth to the pipe section. The semi-cylindrical section is adapted to be positioned in a trench with its lower rounded bottom or surface toward the bottom of the trench, and with this construction the pipe section has increased width as compared with the usual cylindrical pipe heretofore employed, and it also covers a greater horizontal surface area for drainage to more effectively catch the drain water and carry it off by gravity through the pipe composed of numbers of sections 10 interfitted endwise together.

Each section is provided with a bell end 11 and a spigot 12. The spigot 12 of one pipe section 10 is adapted to be interfitted with the bell 11 of an adjacent pipe section in a well known manner and as illustrated in Figures 2, 4, 5 and 8 of the drawings. As many of the sections 10 may be added as required to provide a drainage pipe line of desired length.

The lower curve or rounded wall of the pipe sections are imperforate so as to provide carry-off sections for the water which seeps thereinto. Each pipe section 10 includes a top wall 13 which extends between the upper edge portions of the pipe sections and is transversely curved on a relatively large radius to provide a trough on the top of the pipe section. This top wall 13 extends from end to end of the pipe section 10. It may be inclined from end to end of the pipe section, as in my prior patent, or it may be made without this inclination inasmuch as the pipe sections will be laid on an inclination in the trench. Due to this inclination of the top wall, or due to the inclination or slope on which the entire pipe line is laid, the result is to impart gravitational movement to the drainage water settling upon the top wall 13 causing such water to flow downwardly on such pipe sections until it reaches the end of the pipe sections where it enters the underdrain pipe line through a drainage inlet opening 14. This opening 14 is arranged between adjacent pipe sections 10 and is determinable as to its width or thickness by the width or thickness of spacing pads 19 provided upon the shoulder or flange 20 of the bell end which shoulders or pads are adapted to receive thereagainst the spigot 12 of the adjacent pipe section 10 in the manner best illustrated in Figures 4 and 6. The spigot 12 of one section 10 is received in the bell 11 of the adjacent section and the rounded bottom portion of the spigot 12 is received upon and supported by locating or centering lugs 21, best seen in Figures 1, 3 and 4. These lugs 21 maintain the alignment of the rounded bottom portions 22 of the adjacent pipe sections 10. The locating and centering lugs 21 may also have spacing pads 23 associated therewith against which the end of the spigot 12 abuts. In this way the drainage inlet opening 14 extends all around the entire circumference of the pipe line between adjacent sections and affords a narrow but circumferentially extensive opening for the entrance of water.

The bell 11 is also provided with locking lugs 24 having inclined inner faces 25 to cooperate with complemental inclined surfaces on the edges of wings 27, 28 forming parts of wedge keys 29 and 30. These wedge keys are best illustrated in Figure 7 and they are constructed to be interchangeable from one side of the pipe to the other. The bodies of the wedge keys 29 and 30 have preferably straight side walls 31 and 32 for cooperating with the vertical walls of recesses 33 and 34 made in the upper side portions of the spigot 12 and opening upwardly through the upper edges of the pipe sections 10 to permit wedge keys 29 and 30 to be freely inserted into and removed from the recesses 33 and 34.

The wedge keys may be provided with handles 35 or some means for grasping the same in order to facilitate the insertion and removal of such wedge keys.

It will be noted that the wedge keys comprise rectangular sections to slide in the recesses 33 and 34, such rectangular sections have straight walled edges 31 and 32. The key also comprises the tapered winged edges which may be integral with the rectangular sections. Preferably two winged wedges 27 and 28 are provided for each key so that the keys may be interchanged from one side to the other of the pipe section. Only one wing 27, 28 engages a locking lug 24 at a time, the other wing extending toward a shoulder 20 of the bell. The two wings 27, 28 engage the wedge keys symmetrically so that the keys may be used on either side of the pipe section.

In the use of the device, the spigot 12 of one pipe section may be entered into the bell 11 of an adjacent pipe section with the rounded bottom 22 of the spigot resting upon the locating and centering lugs 21 of the bell. The two pipe sections 10 are moved together until the end wall of the spigot 12 abuts the spacing pads 19 and 23 in which position the recesses 33 and 34 are presented inwardly of the locking lugs 24 so that the wedge keys are now free to be inserted downwardly into such recesses 33 and 34 with their outer wings 27, 28 engaging the inclined or tapered inner walls 25 of the locking lugs 24. As the wedge keys are driven downwardly the rectangular body sections 29, 30 thereof slide in the recesses 33, 34 and the inclined surfaces 26 of the wings 27, 28 engage and slide upon the internally tapering surfaces 25 of the locking lugs 24. This action cams the wedge keys toward the bell shoulder or flange 20 and due to the entrainment of the rectangular portions 29, 30 of the wedge keys in the recesses 33, 34 of the spigot 12, such spigot 12 is forced toward the bell shoulder or flange 20 and tightly against the spacing pads 19, 23 so that an opening 14 of determinable width is arrived at when the wedge keys are driven into their final position.

A satisfactory width for the opening 14 has been found to be one-eighth of an inch so that the spacing pads 19 and 23 may outstand from the free faces of the bell shoulder 20 one-eighth of an inch. The pipe sections may be conveniently two feet long although it is obvious that the invention is not limited to any particular length of pipe section or any particular width of drainage opening 14.

With symmetrical keys it is unnecessary to preselect any particular key for the right or left hand side of the pipe sections. An operator simply picks up the nearest key and turns it to an appropriate position so that the rectangular body enters the recesses 33, 34 and the wings enter the space between the locking lugs 24 and the shoulder 20 of the bell.

Referring more particularly to Figures 5 to 9 of the drawings a slightly modified form of device is provided, more particularly to overcome the difficulty of manufacturing the pipe sections in clay by the extrusion method. The presence of the locking lugs 24 interposes an obstacle to such extrusion process and therefore it is proposed to construct the lugs 24a separately and to attach the same to the bells 11 after the sections 10 have been formed by extruding the clay through the die or mold in the usual way. These separately manufactured locking lugs 24a may be of metal or other appropriate material from which project pins 38 of metal or other material mounted in the backs of the locking lug 24a and which pins are driven through the plastic green clay of the bell after extrusion and before firing takes place. The pins 38 may be nails molded in the cast iron of which the locking lugs 24a are formed. After firing, the pins or nails 38 are firmly embedded in the bell section.

In Figures 5 and 6 is also shown sloped or beveled lips 36 and 37 in the top walls 13 leading mutually downwardly to the drainage opening 14 to facilitate the entrance of the drainage water thereto.

As the drainage water seeps through the superposed fill or soil or through the crushed rock or other filtering media above the subdrainage pipe, such water will collect upon the top walls 13 and will flow longitudinally down the same by the action of gravity until arriving at an opening 14 through which the water will pass and find its way into the next carry-off section and thus throughout the drainage pipe to a disposal location.

Although I have disclosed herein the best form of the invention known to me at this time, I reserve the right to all such modifications and changes as may come within the scope of the following claims.

What I claim is:

1. In a subdrainage pipe composed of a number of pipe sections, each section comprising a substantially semi-cylindrical bottom wall and a top wall having a semi-cylindrical open top bell end and a spigot end, spacing pads provided on the bell ends against which the spigot ends axially engage and whereby a predetermined spacing is maintained between the spigot and bell ends to form drainage openings, means provided internally on the bells to space the spigot ends radially from the bells and locate the sections in alignment, locking lugs provided on the bells adjacent the upper ends thereof, and means engageable with said lugs for locking the spigot ends of the sections on the bells of adjoining sections.

2. The combination of claim 1, wherein one of said sections has its top wall formed with a beveled lip at the upper portion of one of the ends thereof providing a slanting inlet to the drainage openings.

3. The combination of claim 2, wherein said lugs have declined inner edges facing the bell ends and said last-named means is provided with complementary edges adapted to cam on the said inner edges.

4. The combination of claim 1, wherein said last-named means includes wedge shaped keys having protuberances on one of their faces inwardly of the side edges thereof, one of said edges of the wedge shaped keys being complementary to the inner edges of the lugs.

5. The combination of claim 4, wherein said spigot ends have recesses formed externally on the upper edges of the bottom wall to receive the protuberances.

6. The combination of claim 5, wherein said wedge shaped keys have major ends which are disposed substantially flush with the top walls of the sections.

7. The combination of claim 5, wherein said wedge shaped keys have major ends which are disposed substantially flush with the top walls of the sections and have handles extending therefrom.

8. In a subdrainage pipe composed of a number of pipe sections, each section comprising a substantially semi-cylindrical bottom wall and a top wall and having a semi-cylindrical open top bell end and a spigot end, spacing provided on the bell ends against which the spigot ends axially engage and whereby a predetermined spacing is maintained between the spigot and bell ends to form drainage openings, means provided internally on the bells to space the spigot ends radially from the bells and locate the sections in alignment, locking lugs provided on the bells adjacent the upper ends thereof, and means engageable with said lugs for locking the spigot ends of the sections on the bells of adjoining sections, said last-named means including wedges of a thickness complementary to the thickness of the lugs and said lugs and wedges having mating camming side edges and the spigot ends and wedges having interengaging means for securing the wedges to the spigot ends.

9. In a subdrainage pipe composed of a number of pipe sections, each section comprising a substantially semi-cylindrical bottom wall and a top wall and having a semi-cylindrical open top bell end and a spigot end, spacing pads provided on the bell ends against which the spigot ends axially engage and whereby a predetermined spacing is maintained between the spigot and bell ends to form drainage openings, means provided internally on the bells to space the spigot ends radially from the bells and locate the sections in alignment, locking lugs provided on the bells adjacent the upper ends thereof, and means engageable with said lugs for locking the spigot ends of the sections on the bells of adjoining sections, said last-named means including keys, said lugs and keys having mating camming side edges and the spigot ends and keys having interengaging means for securing the keys to the spigot ends.

DANIEL B. DIMICK.

References Cited in the file of this patent

UNITED STATES PATENTS

| Number | Name | Date |
|---|---|---|
| 996,023 | McAdoo | June 20, 1911 |
| 1,103,391 | Armsworth | July 14, 1914 |
| 2,135,103 | Dimick | Nov. 1, 1938 |

FOREIGN PATENTS

| Number | Country | Date |
|---|---|---|
| 17,916 | Great Britain | Sept. 7, 1901 |